3,041,314
POLYESTERS OF NORCAMPHORIC ACID
Samuel C. Temin, Pittsburgh, Pa., assignor to Koppers Company, Inc., a corporation of Delaware
No Drawing. Filed Sept. 19, 1960, Ser. No. 56,635
6 Claims. (Cl. 260—75)

This invention relates to novel polyesters containing a cyclopentane nucleus. In one specific aspect, it relates to new polyesters prepared from norcamphoric acid, cis-cyclopentane-1,3-dicarboxylic acid.

The reaction of a bifunctional dicarboxylic acid or its equivalents with an organic diol results in a class of polymeric products known as polyesters. In recent years, there has been a considerable effort in the art to develop polyesters having exceptionally good adhesive and plasticizing characteristics. Many of the well-known polyesters are crystalline polymers and, because of their crystallinity and other physical properties inherent therewith, their use as plasticizers is markedly limited.

Quite surprisingly, I have discovered a new class of polyesters made from norcamphoric acid or its equivalents which are essentially non-crystalline polymers, characterized by an indefinite melting point and tackiness at about room temperature. The new polyesters of norcamphoric acid are highly transparent, non-volatile, odorless materials. Because of their lack of volatility and inherent softness, they are extremely useful, in amounts of 50 to 100% by weight, as plasticizers for a number of thermoplastic resins, including cellulose derivatives, vinyl chlorides such as polyvinyl chloride, acrylic resins, polyamides, crystalline polyesters and the like. Because of their lack of crystallinity, my new polyesters are also useful as pour point depressives in motor oil when added thereto in small amounts, e.g. from 0.5–5% by weight.

It is therefore an object of the present invention to provide a new class of polyesters which are particularly useful in the plastic, molding, adhesive, and related arts.

In accordance with the present invention, I have discovered a polymer composed of the following recurring structural units:

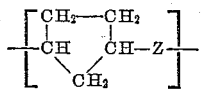

wherein Z is a member selected from the group consisting of

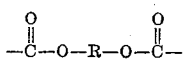

and

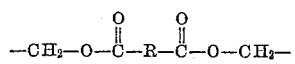

wherein R is a normal alkylene chain having from 2–12 carbon atoms. The novel polymer is the heat reaction product of an organic diol and a bifunctional dicarboxylic compound, one of which contains the cyclopentane nucleus and the other a normal alkylene chain having from 2–12 carbon atoms.

In one embodiment of the invention, polymeric products characterized by the following recurring structural unit:

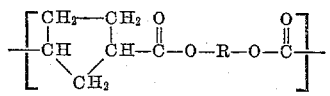

wherein R is as defined aforesaid, are made by reacting norcamphoric acid,

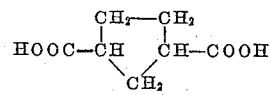

or its equivalents, such as norcamphoryl halides or lower alkyl esters of norcamphoric acid, with an organic diol of the formula: HO—R—OH wherein R is as defined aforesaid.

The new polyesters are made using techniques conventional in the art. Thus, the polymerization is effected by condensing norcamphoric acid or one of its equivalents, such as norcamphoryl chloride, norcamphoryl bromide, diethyl norcamphorate, dimethyl norcamphorate, dibutyl norcamphorate, or the like with a glycol. The norcamphoric acid or norcamphoric acid derivative is condensed with at least a stoichiometric quantity of glycol in the presence or absence of an inert organic solvent such as dimethyl formamide, chlorinated hydrocarbons, high boiling ethers and ketones, and the like. If desired, the acid or its derivative may be heated with an excess of the glycol, e.g. 3–4 moles of glycol per mole of acid, in the presence of a suitable catalyst, although under these conditions more time to complete the reaction is sometimes required. Useful polymerization catalysts include various inorganic salts such as litharge, antimony oxide, cobaltous acetate, and zinc acetate. Metallic catalysts, such as magnesium ribbon or sodium metal, can also be used. Other suitable catalysts are boric oxide and the alkali titanates.

The polymerization temperature can vary from about 125° C. to 300° C. It is preferred to conduct the polymerization using an initial temperature of about 125–175° C. for a period of about 2 hours and a final temperature of about 175–250° C. for about 2–5 hours. Longer heating times and the use of reduced pressures during the latter heating stage are recommended for producing polymers of high molecular weight.

It is desirable to conduct the polymerization in an inert, non-oxygen containing atmosphere to produce polymers of good color. A preferred technique is to bubble an inert gas, such as nitrogen or hydrogen, through the molten mixture.

In another embodiment of the invention, new polyesters characterized by the following recurring structural unit:

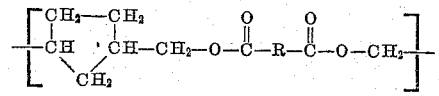

are made by reacting 1,3-bis(hydroxymethyl)cyclopentane with a dibasic organic acid of the formula:

wherein R is as defined aforesaid. Exemplary dibasic organic acids include adipic, sebacic, pimelic, and azelaic acids. These polyesters are made by the polymerization techniques described aforesaid.

My invention is further illustrated by the following examples:

Example I

A mixture of 4.417 grams of dimethyl norcamphorate, 3.016 grams of ethylene glycol, 0.006 gram of litharge, and 0.0023 gram of $Co(COCH_3)_2 \cdot 4H_2O$ was heated with nitrogen bubbling through a capillary tube reaching to the bottom of the mixture. The mixture was heated at 200° for 3 hours, then at 220° for one hour. Vacuum was gradually applied until a pressure of about 1 mm. of mercury absolute was attained. The mixture was then heated at 230° and at a pressure of 1 mm. for 4 hours. On cooling, a sticky gum was obtained which required heat to flow freely. A 0.5% by weight solution in tetrachloroethane-phenol solvent gave $n_{sp/c} = 0.468$.

Example II

A mixture of 3.5 g. 1,3-butanediol, 3.0 g. dimethyl norcamphorate, 0.004 g. PbO, and 0.001 g. cobaltous acetate tetrahydrate were heated, with nitrogen bubbling through the melt, at 190° to 210° over a period of 100 min. All of the methanol was removed during this period. Vacuum was then gradually applied and the melt was heated at 210–215° and 1 mm. pressure for about two hours. On cooling, an extremely viscous transparent fluid was obtained which was sticky to the touch. Aluminum foil treated with this polymer stuck to itself but could be easily peeled and restuck. The polymer was solid at −80° but tacky at temperatures a little above that. It was soluble in methylene chloride and acetone. When tested for solution viscosity according to the technique of Example I, a value of $n_{sp/c}=0.446$ was obtained.

*Example III*

A mixture of 3.3 g. of anhydrous 1,4-butanediol, 3.0 g. of dimethyl norcamphorate, 0.04 g. of litharge and 0.01 g. Co(COCH₃)₂·4H₂O was placed in an 18 x 150 mm. test tube fitted with a nitrogen inlet capillary and an exit tube. The test tube was heated in a silicone oil-bath at 170° for two hours, and then at temperatures gradually increasing to 235° over a period of three hours, while the pressure was gradually lowered to 30 mm. The pressure was then lowered to 1 mm. and heating continued for 3 hours at 1 mm. On cooling, a soft, viscous polymer was obtained, soluble in methylene chloride. The soft, tacky, solid became mobile when heated to temperatures of about 70–100° C. The solution viscosity, measured as in Example I, was $n_{sp/c}=0.504$.

*Example IV*

A mixture of 3.50 1,2-propyleneglycol, 3.0 g. dimethyl norcamphorate, 0.004 g. litharge and 0.001 g. cobalt acetate tetrahydrate, while under a nitrogen atmosphere, was heated at 210° C. for 2 hours, then at 220° C. and 1 mm. pressure for 4 hours. The product was a viscous, but not particularly "sticky," colorless polyester. Value found, as in Example I, for $n_{sp/c}$ was 0.082.

*Example V*

A mixture of 3.47 g. of norcamphoric acid, 2.44 g. of 1,6-hexamethylene glycol and 0.05 g. of antimony oxide (Sb₂O₃) was heated, with nitrogen bubbling through the melt, at 190° for 2 hours, at 190–210° for an additional two hours, and then at about 1 mm. vacuum at 210–235° for 2 hours and, finally, at 235–250° for 1.5 hours. The polymer was an extremely viscous, colorless oil. Measured as in Example I, $n_{sp/c}$ was 0.238.

I have thus provided a new class of polyester resins particularly useful as plasticizers for a wide variety of thermoplastic materials. The new polyesters are surprisingly effective, since they are non-volatile, odoress, and do not discolor the plasticized product upon prolonged exposure to heat and light.

I claim:

1. A polymer composed of the following recurring structural units:

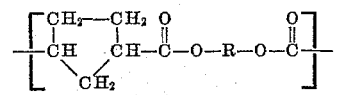

wherein R is a normal alkylene chain having from 2–12 carbon atoms, comprising the condensation product of a norcamphoric acid compound and at least a stoichiometric quantity of an organic diol of the formula

HO—R—OH wherein R is as defined aforesaid, at a temperature of 125–300° C.

2. A polymer according to claim 1 wherein said organic diol is ethylene glycol and said norcamphoric acid compound is dimethyl norcamphorate.

3. A polymer according to claim 1 wherein said organic diol is 1,3-butanediol and said norcamphoric acid compound is dimethyl norcamphorate.

4. A polymer according to claim 1 wherein said organic diol is 1,4-butanediol and said norcamphoric acid compound is dimethyl norcamphorate.

5. A polymer according to claim 1 wherein said organic diol is 1,2-propylene glycol and said norcamphoric acid compound is dimethyl norcamphorate.

6. A polymer according to claim 1 wherein said organic diol is hexamethylene glycol and said norcamphoric acid compound is norcamphoric acid.

References Cited in the file of this patent

UNITED STATES PATENTS 2,197,855    Ellis _____ Apr. 23, 1940

FOREIGN PATENTS 785,214    Great Britain _____ Oct. 23, 1957